(12) United States Patent
Yabuuchi et al.

(10) Patent No.: US 9,203,088 B2
(45) Date of Patent: Dec. 1, 2015

(54) COMPOSITE METAL OXIDE, PROCESS FOR PRODUCING THE COMPOSITE METAL OXIDE, POSITIVE ACTIVE MATERIAL FOR SODIUM SECONDARY BATTERY, POSITIVE ELECTRODE FOR SODIUM SECONDARY BATTERY, AND SODIUM SECONDARY BATTERY

(75) Inventors: Naoaki Yabuuchi, Tokyo (JP); Shinichi Komaba, Tokyo (JP); Junichi Iwatate, Tokyo (JP)

(73) Assignee: TOKYO UNIVERSITY OF SCIENCE EDUCATIONAL FOUNDATION ADMINISTRATIVE ORGANIZATION (JP)

( * ) Notice: Subject to any disclaimer, the term of this patent is extended or adjusted under 35 U.S.C. 154(b) by 141 days.

(21) Appl. No.: 13/883,172

(22) PCT Filed: Oct. 28, 2011

(86) PCT No.: PCT/JP2011/074950
§ 371 (c)(1),
(2), (4) Date: Jul. 22, 2013

(87) PCT Pub. No.: WO2012/060295
PCT Pub. Date: May 10, 2012

(65) Prior Publication Data
US 2014/0014873 A1 Jan. 16, 2014

(30) Foreign Application Priority Data
Nov. 5, 2010 (JP) .................................. 2010-248531

(51) Int. Cl.
| | |
|---|---|
| *H01M 4/505* | (2010.01) |
| *C01D 1/02* | (2006.01) |
| *C01G 45/12* | (2006.01) |
| *C01G 49/00* | (2006.01) |
| *H01M 4/525* | (2010.01) |

(Continued)

(52) U.S. Cl.
CPC .................. *H01M 4/505* (2013.01); *C01D 1/02* (2013.01); *C01G 45/1228* (2013.01);
(Continued)

(58) Field of Classification Search
CPC .................................. H01M 4/505; C01D 1/02
USPC ........................................................ 252/182.1
See application file for complete search history.

(56) References Cited

U.S. PATENT DOCUMENTS
2002/0098146 A1 * 7/2002 Takada et al. ................. 423/594

FOREIGN PATENT DOCUMENTS
| | | |
|---|---|---|
| EP | 2139058 A1 | 12/2009 |
| JP | 2009135092 A | 6/2009 |

(Continued)

OTHER PUBLICATIONS

J.M.Paulsen et al., O2 Structure Li2/3[Ni1/3Mn2/3]O2: A New Layered Cathode Material for Rechargeable Lithium Batteries III. Ion Exchange, Journal of The Electrochemical Society, Aug. 2000, vol. 147, No. 8, p. 2862-2867.

(Continued)

*Primary Examiner* — Mark Kopec
*Assistant Examiner* — Danny N Kang
(74) *Attorney, Agent, or Firm* — Cantor Colburn LLP

(57) ABSTRACT

Provided are: a composite metal oxide with which it is possible to improve the performance of a sodium secondary battery; a process for producing the composite metal oxide; a positive active material which comprises the composite metal oxide; a positive electrode produced using the positive active material; and a sodium secondary battery including the positive electrode. The composite metal oxide is represented by the following formula: $Na_xFe_yMn_{1-y}O_2$. The composite metal oxide is constituted of an oxide having a P2 structure and a lamellar oxide, with some extent of stacking faults, having an octahedral structure and/or a triangular-prism structure. The lamellar oxide preferably is an oxide having an O3 structure.

7 Claims, 6 Drawing Sheets

(51) Int. Cl.
*H01M 4/36* (2006.01)
*H01B 1/08* (2006.01)
*H01M 10/054* (2010.01)

(52) U.S. Cl.
CPC .......... *C01G 49/0072* (2013.01); *H01M 4/364* (2013.01); *H01M 4/525* (2013.01); *C01P 2002/54* (2013.01); *C01P 2002/72* (2013.01); *H01M 10/054* (2013.01); *Y02E 60/122* (2013.01)

(56) References Cited

FOREIGN PATENT DOCUMENTS

| JP | 2009209037 A | 9/2009 |
|---|---|---|
| JP | 2010080424 A | 4/2010 |
| WO | 2009060828 A1 | 5/2009 |
| WO | 2009099061 A1 | 8/2009 |
| WO | WO 2009099061 A1 * | 8/2009 |
| WO | 2010024304 A1 | 3/2010 |

OTHER PUBLICATIONS

Endova-Vassileva, Marushka: "Raman spectroscopy study on Na2/3Mn1-xFexO2 oxides", Advances in Science and Technology, vol. 74(5th Forum on New Materials, 2010, Part C), Oct. 27, 2010, pp. 60-65, XP008171326.

Extended European Search Report corresponding to Application No. 11837945.2; Date of Mailing: Jun. 26, 2015.

* cited by examiner

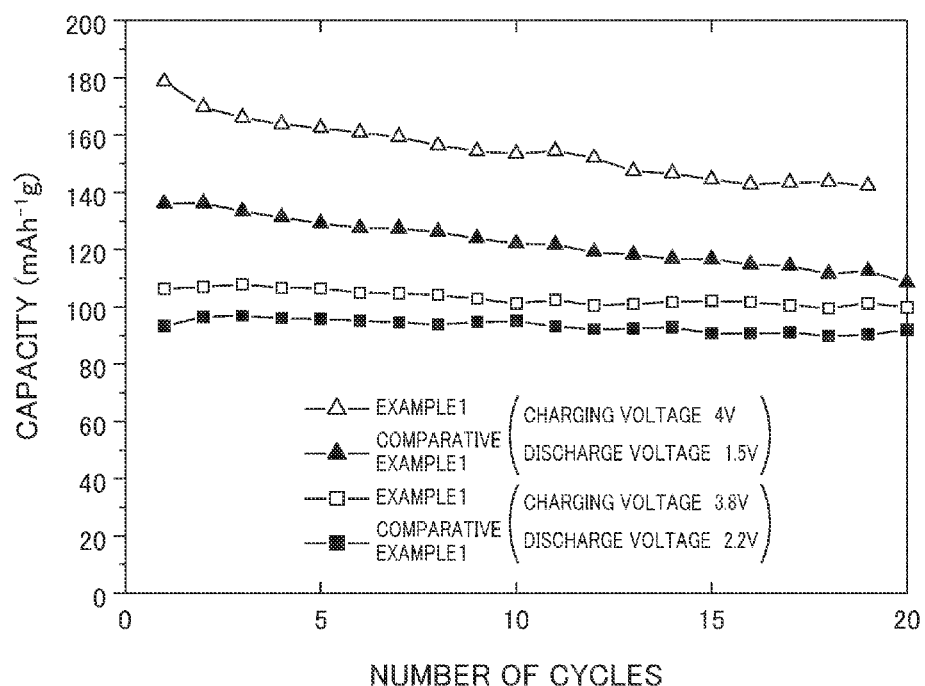

COMPOSITE METAL OXIDE, PROCESS FOR PRODUCING THE COMPOSITE METAL OXIDE, POSITIVE ACTIVE MATERIAL FOR SODIUM SECONDARY BATTERY, POSITIVE ELECTRODE FOR SODIUM SECONDARY BATTERY, AND SODIUM SECONDARY BATTERY

CROSS-REFERENCE TO RELATED APPLICATIONS

This application is the National Stage of International Application No. PCT/JP2011/07450, filed Oct. 28, 2011, which claims the benefit of Japanese Application No. 2010-248531, filed Nov. 5, 2010, the contents of which are incorporated by reference herein.

TECHNICAL FIELD

The present invention relates to a composite metal oxide, a process for producing the composite metal oxide, a positive active material for sodium secondary battery, a positive electrode for sodium secondary battery, and a sodium secondary battery.

BACKGROUND ART

Presently, as secondary batteries of high-energy density, lithium-ion secondary batteries are widely employed that are made using a nonaqueous electrolytic solution in which an electrolyte salt is dissolved in a nonaqueous solvent, so as to carry out charge-discharge by causing lithium ions to migrate between a positive electrode and a negative electrode. Specifically, lithium secondary batteries have already been practically used such as small power supplies of cell phones or notebook computers. Further, since the lithium secondary batteries can be used as power supplies such as power supplies for vehicles including electric vehicles and hybrid vehicles, or larger power supplies of distributed power storage, there have been increasing demands for the lithium secondary batteries.

However, the lithium secondary battery includes a number of rare metal elements such as lithium in its electrode-forming materials. Therefore, there is a concern that the supply instability of the materials according to increasing demands for large power supplies occurs.

A study on a sodium secondary battery has been promoted to solve the supply problem. A positive active material used for the sodium secondary battery contains sodium which is a rich and inexpensive resource, instead of lithium. Therefore, when the sodium secondary battery can be practically used, the large power supplies can be supplied in a large quantity.

Patent Documents 1 to 3 disclose that a composite metal oxide containing Na, Mn, and Fe has been used as a positive active material for the sodium secondary battery.

Patent Document 1: Japanese Unexamined Patent Application, Publication No. 2009-135092
Patent Document 2: Japanese Unexamined Patent Application, Publication No. 2009-209037
Patent Document 3: Japanese Unexamined Patent Application, Publication No. 2010-080424

DISCLOSURE OF THE INVENTION

Problems to be Solved by the Invention

The performances of sodium secondary batteries with the positive active material containing composite metal oxides disclosed in Patent Documents 1 to 3 are not sufficient compared to those of lithium secondary batteries which are practically used at present. Therefore, the performance improvement of the sodium secondary battery is required for a practical use of the sodium secondary battery.

The present invention is made to solve the problem and an object thereof is to provide a composite metal oxide with which it is possible to improve the performances of a sodium secondary battery; a process for producing the composite metal oxide; a positive active material which includes the composite metal oxide; a positive electrode produced using the positive active material; and a sodium secondary battery including the positive electrode.

Means for Solving the Problems

The present inventors have thoroughly researched in order to solve the aforementioned problems. As a result, the inventors have found out that the problem is solved by using a composite metal oxide containing Na, Mn, and Fe and is constituted of an oxide having a P2 structure and a lamellar oxide, with some extent of stacking faults, having an octahedral structure. Thus, the present invention has been completed. More specifically, the present invention provides the followings.

(1) A composite metal oxide represented by the following formula (I):

$$Na_xFe_yMn_{1-y}O_2 \qquad (I)$$

wherein the value of x is ⅔ or more and less than 1, and the value of y is larger than 0 and less than ⅔, and wherein the composite metal oxide is constituted of an oxide having a P2 structure and a lamellar oxide, with some extent of stacking faults, having an octahedral structure and/or a triangular-prism structure.

(2) The composite metal oxide according to (1), wherein the lamellar oxide is an oxide having an O3 structure.

(3) The composite metal oxide according to (1) or (2), wherein a ratio of the lamellar oxide present in the composite metal oxide is 3 to 15% by volume.

(4) A process for producing the composite metal oxide according to any one of (1) to (3), the process including calcination of a mixture of a sodium compound, a manganese compound, and an iron compound under a temperature of 800 to 1000° C. for 2 to 24 hours.

(5) A positive active material for a sodium secondary battery, the positive active material containing the composite metal oxide according to any one of (1) to (3).

(6) A positive electrode for a sodium secondary battery, the positive electrode including the positive active material according to (5).

(7) A sodium secondary battery including the positive electrode according to (6).

Effects of the Invention

When the composite metal oxide of the present invention is used as a positive active material for a sodium secondary battery, a performance of the sodium secondary battery can be improved compared with that of a sodium secondary battery in the related art.

BRIEF DESCRIPTION OF THE DRAWINGS

FIG. 3 shows a relationship between a cycle number and capacity in Evaluation 3 with respect to the sodium secondary battery of Example 1 and the sodium secondary battery of Comparative Example 1.

PREFERRED MODE FOR CARRYING OUT THE INVENTION

Figure 1A:
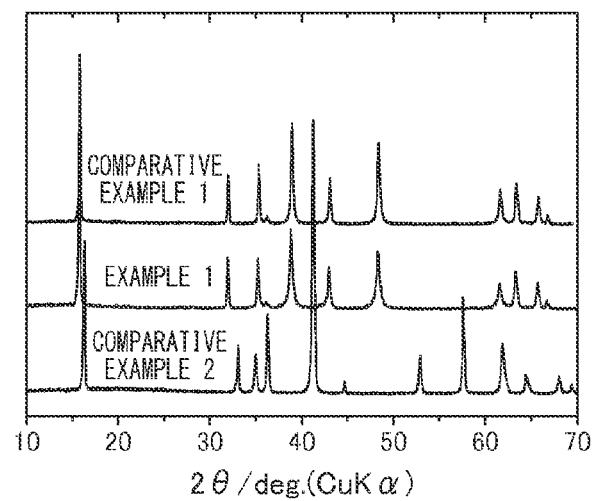
FIG. 1A shows a measurement result of powder X-ray diffraction for a composite metal oxide used in Examples 1, Comparative Example 1 and Comparative Example 2.

Embodiments of the present invention will be described in detail below. Further, the present invention is not limited to the following embodiments.

Composite Metal Oxide

The composite metal oxide of the present invention is represented by the following formula (I):

$$Na_xFe_yMn_{1-y}O_2 \qquad (I)$$

wherein the composite metal oxide is constituted of an oxide having a P2 structure and a lamellar oxide, with some extent of stacking faults, having an octahedral structure and/or a triangular-prism structure. In the formula (I), the value of x is ⅔ or more and less than 1, and the value of y is larger than 0 and less than ⅔. More preferably, the value of y is larger than ⅓ and less than 0.6. Such composite metal oxide is used as a positive active material for the sodium secondary battery, and therefore performance of the sodium secondary battery can be improved.

The range of the value of x and y where the composite metal oxide easily contains both the crystal structure and the lamellar crystal structure is ⅔≤x≤⅚, and ⅓≤y≤½, respectively. When the value of y is set to a high value in the aforementioned range, the value of x is preferably set to a low value in the aforementioned range.

Here, the values of x and y can be adjusted by adjusting an amount of raw materials used when producing a composite metal oxide, production conditions and the like. Details thereof will be described below.

Examples of the lamellar oxide, with some extent of stacking faults, having an octahedral structure and/or a triangular-prism structure, may include an oxide having an $O_2$ structure, an oxide having an O3 structure and an oxygen arrangement similar to the O3 structure. In the present invention, it is preferable that the lamellar oxide be an oxide having an O3 structure.

As to whether or not the composite metal oxide contains an oxide having a P2 structure and the lamellar oxide, it can be confirmed by X-ray diffraction. Specifically, it can be confirmed by a method described in Examples.

According to the X-ray diffraction, a ratio of the lamellar oxide present in the composite metal oxide can be also confirmed. In the present invention, the ratio of the lamellar oxide is not particularly limited, but is preferably in range of 3 to 15% by volume.

The composite metal oxide can be produced by calcination of a mixture of metal-containing compounds which have a composition of the composite metal oxide of the present invention to be formed by calcination.

Specifically, the composite metal oxide can be produced in such a manner that metal-containing compounds containing the corresponding metal elements are weighed and mixed so as to have a predetermined composition, and then the resultant mixture is calcined.

For example, a composite metal oxide having a metal element ratio represented by Na:Fe:Mn=⅔:⅓:⅔ can be produced by weighing and mixing raw materials of sodium carbonate, iron oxide, and manganese oxide so as to have a molar ratio of Na:Fe:Mn of ⅔:⅓:⅔, and calcining the resultant mixture.

Examples of the metal-containing compounds which can be used for producing the composite metal oxide may include oxides, and compounds to be formed into an oxide when being decomposed and/or oxidized at a high temperature, for example, hydroxides, carbonates, nitrates, sulfates, halides, and oxalates. Examples of the sodium compounds preferably include $Na_2CO_3$, $NaHCO_3$, and $Na_2O_2$. From the viewpoint of handling, $Na_2CO_3$ is more preferable. Examples of the manganese compounds preferably include $MnO_2$. Examples of the iron compounds preferably include $Fe_3O_4$. Further, these metal-containing compounds may be hydrate.

Industrially available apparatus such as a ball mill, a V-type mixer, or a stirrer can be used for the mixing the metal-containing compounds. The mixing at this time may be any one of dry mixing and wet mixing. Further, a mixture of the metal-containing compounds having a predetermined composition may be obtained by a crystallization method.

The composite metal oxide can be obtained by calcination of the mixture of the metal-containing compounds. With respect to the process for producing the composite metal oxide of the present invention, it is necessary that calcination is performed under 800 to 1000° C. for 2 to 24 hours. When a calcination temperature is 800° C. or higher, excessive generation of stacking fault can be suppressed. When a calcination temperature is 1000° C. or lower, a primary particle size can be reduced. Further, when a calcination time is 2 hours or longer, a homogeneous chemical composition in a single particle can be obtained. When the content of Fe in the mixture of the metal-containing compounds is higher and a calcination time is shorter than 24 hours, the crystal growth with the enriched stacking faults can be occurred under the condition of a lower temperature.

As to whether or not the composite metal oxide contains both an oxide having a P2 structure and a lamellar oxide having an octahedral structure, it also depends on ranges of a calcination temperature and a calcination time. For example, in a case where a calcination temperature is 800 to 900° C., a calcination time is set to 12 to 24 hours. In a case where a calcination temperature is 900 to 1000° C., a calcination time is set to 2 to 12 hours. By doing this, a composite metal oxide containing both an oxide having a P2 structure and a lamellar oxide having an octahedral structure is easily obtained. Especially, when the content of Fe in the mixture of the metal-containing compounds is higher, by calcination of the mixture at 800° C. for 24 hours, it is possible to increase a ratio of stacking fault present in the composite metal oxide.

When a compound to be decomposed and/or oxidized at a high temperature, for example, hydroxides, carbonates, nitrates, sulfates, halides, and oxalates can be used as a mixture of the metal-containing compounds, the calcination can be performed after the compound is calcined with maintaining a temperature range of 400 to 1600° C. to form an oxide or remove crystalline water. Calcining atmosphere may be any of inert gas atmosphere, oxidative atmosphere or reductive atmosphere. Further, after calcining, pulverization can be also performed.

The atmosphere at the time of calcination may be any one of inert atmosphere such as nitrogen or argon; oxidative atmosphere such as air, oxygen, oxygen-containing nitrogen, or oxygen-containing argon; and reductive atmosphere such as hydrogen-containing nitrogen containing 0.1 to 10% by volume of hydrogen, hydrogen-containing argon containing 0.1 to 10% by volume of hydrogen. For calcination in a strong reductive atmosphere, a suitable amount of carbon is added to a mixture of metal-containing compounds, which may be calcined. Preferably, calcination is performed in an oxidative atmosphere such as air.

By using a suitable amount of halides such as fluoride or chloride as the metal-containing compound, crystalline of the composite metal oxide to be produced, an average particle size of particles forming the composite metal oxide can be controlled. In this case, halides may serve as a reaction accelerator, e.g., flux. Examples of the fluxes may include NaF, $MnF_3$, $FeF_2$, $NiF_2$, $CoF_2$, NaCl, $MnCl_2$, $FeCl_2$, $FeCl_3$, $NiCl_2$, $CoCl_2$, $Na_2CO_3$, $NaHCO_3$, $NH_4Cl$, $NH_{41}$, $B_2O_3$, and $H_3BO_3$. These compounds can be used as raw materials, e.g., metal-containing compounds, of the mixture or by addition to the mixture in a suitable amount. Further, these fluxes may be hydrate.

Further, it may be preferable that the composite metal oxide obtained as described above be optionally subjected to pulverization using a ball mill or a jet mill, cleaning or classification, and thus particle size be controlled. Further, calcination may be performed two times or more. Further, a surface treatment in which the particle surface of the composite metal oxide is coated with an inorganic material containing Si, Al, Ti or Y may be performed. Further, the composite metal oxide of which the crystal structure is not a tunnel structure is preferable.

Sodium Secondary Battery

The sodium secondary battery of the present invention includes a positive electrode having the positive active material containing the composite metal oxides, a negative electrode capable of adsorbing and desorbing sodium ions, and electrolyte. The positive electrode, the negative electrode, and the electrolyte will be described below.

Positive Electrode

The positive electrode includes a collector, and a positive active material layer containing a positive active material, a conductive material and a binder formed on the surface of the collector.

The content of the positive active material in the positive active material layer is not particularly limited, but the content thereof is preferably in the range of 80 to 95% by mass.

Examples of the conductive material which can be used for the present invention include carbon materials such as natural graphite, synthetic graphite, cokes, or carbon black. The content of the conductive material in the positive active material layer is not particularly limited, but the content thereof is preferably 5 to 10% by mass.

Examples of the binder which can be used for the present invention include polyvinylidene fluoride, hereinafter, referred to as PVDF, polytetrafluoroethylene, hereinafter, referred to as PTFE, an ethylene tetrafluoride.propylene hexafluoride.vinylidene fluoride-based copolymer, a propylene hexafluoride.vinylidene fluoride-based copolymer, an ethylene tetrafluoride.perfluorovinylether-based copolymer. These binders may be used singly or in combination of two or more kinds. Other examples of the binder include polysaccharides such as starch, methylcellulose, carboxymethylcellulose, hydroxymethylcellulose, hydroxyethylcellulose, hydroxypropylcellulose, carboxymethylhydroxyethylcellulose, nitrocellulose, and a derivative thereof. Examples of the binder which can be used may include inorganic particles such as colloidal silica. The content of the binder in the positive active material is not particularly limited, but the content thereof is preferably 5 to 10% by mass.

Examples of the collector which can be used for the present invention include a foil using conductive materials such as nickel, aluminum, and stainless steel, i.e., SUS; a mesh; an expand grid, e.g., expand metal; or a punched metal. A mesh grid, a wire diameter, or a mesh number is not particularly limited, and the known mesh grid, wire diameter, or mesh number in the related art can be used. The thickness of the collector is generally in the range of 5 to 30 μm. However, a collector having a thickness other than the aforementioned range may be used.

The size of the collector is determined depending on use application of a battery. When a large electrode for a large battery is produced, a collector having a large surface area is used. When a small electrode is produced, a collector having a small surface area is used.

With respect to a process for producing the positive electrode, first, a positive active material, a conductive material, a binder and an organic solvent are mixed to prepare a positive active material slurry. Examples of the organic solvent which can be used include amine-based solvents such as N,N-dimethylaminopropylamine and diethyltriamine; ether-based solvents such as ethylene oxide and tetrahydrofurane; ketone-based solvents such as methylethylketone; ester-based solvents such as methyl acetate; non-proton polar solvents such as dimethylacetamide, N-methyl-2-pyrrolidone.

Subsequently, the positive active material slurry is applied on the positive collector, dried, and then fixed by pressing or the like. Examples of the method of applying the positive active material slurry on the positive collector may include a slit die coating, a screen coating, a curtain coating, a knife coating, a gravure coating, or an electrostatic spray.

Further, examples of the method of forming the positive active material layer on the positive collector include, other than the aforementioned method, a method in which a mixture of the positive active material, conductive material, and binder is stacked on the positive collector, followed by carrying out pressing and molding.

Negative Electrode

The negative electrode includes a collector, and a negative active material layer containing a negative active material and a binder formed on the surface of the collector. Further, an electrode containing materials capable of absorbing and desorbing sodium ions may be used as the negative electrode.

Examples of the negative active material include carbon materials such as natural graphite, synthetic graphite, cocks, hard carbon, carbon black, thermal cracking carbons, carbon fiber, or organic polymer compound calcined body which is capable of absorbing and desorbing sodium ions. Examples of shape of the carbon material include any one of flake-like such as natural graphite, sphere-like such as mesocarbon microbeads, fiber-like such as graphitized carbon fiber or micronized aggregate. The carbon material may serve as a conductive material.

As described above, the negative active material of the present invention is not particularly limited, but hard carbon is preferably used. When the hard carbon is used as the negative active material, reduction of a battery performance caused by the negative active material is suppressed.

The hard carbon is a carbon material that stacking order is not almost changed when the hard carbon is subjected to a heating treatment at a high temperature of 2000° C. or higher. The hard carbon is also called non-graphitizable carbon. Examples of the hard carbon include a carbon fiber where a non-soluble yarn as an intermediate product during the production of carbon fiber is carbonized in a range of 1000 to 1400° C. or a carbon material where an organic compound is oxidized by air in a range of 150 to 300° C., and then carbonized in a range of 1000 to 1400° C. The method for producing the hard carbon is not particularly limited, but hard carbon produced by known methods in the related art can be used.

An average particle size, a net density, and interplanar spacing of (002) planes of the hard carbon are not particularly limited, but they are suitably selected and a preferable hard carbon can be produced.

The content of the negative active material in the negative active material layer is not particularly limited, but the content thereof is preferably in the range of 80 to 95% by mass.

Since the binder which is the same as that capable of being used for the positive electrode can be used, the description thereof will not be repeated. Examples of the collector which is used include conductive materials such as nickel, iron, stainless steel, i.e., SUS. Similarly to the collector for the positive electrode, the collector includes a foil, a mesh, an expand grid, e.g., expand metal, or a punched metal.

Further, a method for forming a negative active material layer on the collector, which is the same as a method for forming a positive active material layer on the collector can be used.

Electrolyte

The electrolyte is not particularly limited, but any of general electrolytic solution and solid electrolyte can be used. Examples of the electrolytic solution which can be used include carbonates such as propylene carbonate, ethylene carbonate, dimethyl carbonate, diethyl carbonate, ethyl methyl carbonate, isopropyl methyl carbonate, vinylene carbonate, 4-trifluoromethyl-1,3-dioxolan-2-on, 1,2-di(methoxycarbonyloxy)ethane; ethers such as 1,2-dimethoxyethane, 1,3-dimethoxypropane, pentafluoropropylmethylether, 2,2,3,3-tetrafluoropropyldifluoromethylether, tetrahydrofurane, 2-methyltetrahydrofurane; esters such as methyl formate, methyl acetate, γ-butyrolactone; nitriles such as acetonitrile, butyronitrile; amides such as N,N-dimethylformamide, N,N-dimethylacetoamide; carbamates such as 3-methyl-2-oxazolidone; sulfur-containing compounds such as sulfolane, dimethyl sulfoxide, 1,3-propanesultone; or compounds introducing a fluorine substituent to the organic solvent. Generally, as the organic solvent, two or more of kinds among these are used in combination.

Among the electrolytic solutions, substantially saturated cyclic carbonate excluding the use of ethylene carbonate alone, or a non-aqueous solvent consisted of a mixture of saturated cyclic carbonate and chain carbonate is preferably used. Particularly, when any one of these non-aqueous solvents is used, and hard carbon is used as the negative active material, the sodium ion secondary battery has good charge-discharge efficiency and good charge-discharge characteristics.

The term "substantially" refers to, in addition to a non-aqueous solvent consisted of saturated cyclic carbonate alone excluding the use of ethylene carbonate alone, a non-aqueous solvent consisted of a mixture of saturated cyclic carbonate and chain carbonate, containing a solvent that the aforementioned non-aqueous solvent used for the present invention includes other solvents in a range where they do not affect sodium ion secondary battery performance such as charge-discharge characteristics.

Among the saturated cyclic carbonates, propylene carbonate is preferably used. Further, among the mixed solvents, a mixed solvent of ethylene carbonate and diethylene carbonate or a mixed solvent of ethylene carbonate and propylene carbonate is preferably used.

When electrolytic solution is used as the electrolyte, electrolyte salts capable of being used are not particularly limited, but electrolytes salts which have been generally used for the sodium secondary battery can be used.

Examples of the electrolyte salts used for the sodium secondary battery may include $NaClO_4$, $NaPF_6$, $NaBF_4$, $CF_3SO_3Na$, $NaAsF_6$, $NaB(C_6H_5)_4$, $CH_3SO_3Na$, $CF_3SO_3Na$, $NaN(SO_2CF_3)_2$, $NaN(SO_2C_2F_5)_2$, $NaC(SO_2CF_3)_3$, $NaN(SO_3CF_3)_2$. Furthermore, the electrolyte salts may be used singly, or in combination of two or more kinds.

Further, a concentration of the electrolyte salt in the electrolytic solution is not particularly limited, but a concentration of the electrolyte salt is preferably 3 to 0.1 mol/L, and more preferably 1.5 to 0.5 mol/L.

Examples of the solid electrolyte may include organic-based solid electrolytes such as a polyethyleneoxide-based polymer compound, and a polymer compound containing at least one or more kinds of polyorganosiloxane chain and polyoxyalkylene chain. Further, so called a gel-type polymer compound, maintaining non-aqueous electrolyte solution in polymer compound, can be used. Inorganic-based solid electrolytes such as $Na_2S$—$SiS_2$, $Na_2S$—$GeS_2$, $NaTi_2(PO_4)_3$, $NaFe_2(PO_4)_3$, $Na_2(SO_4)_3$, $Fe_2(SO_4)_2(PO_4)$, $Fe_2(MoO_4)_3$ may be used.

Examples of the negative electrode which can be used include a negative electrode collector supported with a negative binder containing the negative active materials, or an electrode capable of adsorbing and desorbing sodium ions such as sodium metal or sodium alloy.

Structure of Sodium Secondary Battery

The structure of the sodium secondary battery of the present invention is not particularly limited, but, when classifying a battery according to type and structure, can be applied to any known type and structure in the related art such as a lamination type, e.g., flat type, battery or a wound type, e.g., cylinder type, battery. Further, from the viewpoint of electrical connection type, e.g., electrode structure, in the sodium ion secondary battery, the structure of the sodium secondary battery can be applied to any of an internal parallel connection type battery and a bipolar type, e.g., internal serial connection type, battery.

EXAMPLES

The present invention will be described in detail based on Examples. Further, the present invention is not intended to be limited to the following Examples.

Example 1

Sodium carbonate, i.e., $Na_2CO_3$, manufactured by Wako Pure Chemical Industries, Ltd., with a purity of 99.8%, manganese oxide (IV), i.e., $MnO_2$, manufactured by Kojundo Chemical Lab. Co., Ltd., with a purity of 99.9%, and iron oxide (II, III), i.e., $Fe_2O_4$, manufactured by Kojundo Chemical Lab. Co., Ltd., with a purity of 99%, were weighed such that a molar ratio of Na:Mn:Fe is 2/3:2/3:1/3, and mixed in an agate mortar over an hour to obtain a mixture of metal-containing compounds. The resultant mixture was charged into an alumina boat, and calcined in an air atmosphere using an electric furnace under the condition of at 900° C. for 12 hours to obtain a composite metal oxide of Example 1, i.e., $Na_{0.67}Mn_{0.67}Fe_{0.33}O_2$.

Each of a positive active material containing the composite metal oxide, acetylene black as a conductive material, and polyvinylidene fluoride as a binder was weighed to have a composition of positive active material:conductive material: binder=80:10:10 based on a mass ratio. Then, first, the positive active material and conductive material were sufficiently mixed in an agate mortar, to the mixture was added N-methylpyrrolidone, followed by homogeneously mixing, to form a slurry. The resultant positive active material slurry was applied in a thickness of 80 μm with an applicator on an aluminum foil having a thickness of 20 μm as a collector, followed by putting into a dryer, sufficient drying was performing while N-methylpyrrolidone is removed, to obtain an electrode sheet. The electrode sheet was punched to a diameter of 1.0 cm with an electrode punching machine, and was pressed sufficiently with a hand presser to obtain a positive electrode.

To a solid consisted of 90% by mass of hard carbon having an average particle size of about 10 μm as a negative active material, e.g., trade name, "CARBOTRON P" manufactured by KUREHA Corporation and 10% by mass of polyvinylidene fluoride as a binder, was added NMP, i.e., N-methylpyrrolidone as a solvent in a suitable amount, to prepare a negative active material slurry. On the other hand, nickel meshes were prepared as a collector for a negative electrode. One of surfaces of the prepared collector was coated with the prepared negative active material slurry by a doctor blade method to form a film. Subsequently, the film was subjected to vacuum drying at 90° C.

Subsequently, a bipolar coin-type sodium secondary battery was produced. The negative electrode produced by using the hard carbon as a working electrode and the positive electrode produced by using the composite metal oxide as a counter electrode were used to produce a coin-type sodium secondary battery. As the electrolytic solution, 1M electrolyte salt, i.e., $NaClO_4$ dissolved in a non-aqueous solvent, i.e., propylene carbonate was used. Further, a sodium secondary battery was produced in a glove box filled with argon.

Example 2

A composite metal oxide of Example 2, i.e., $Na_{0.7}Fe_{0.5}Mn_{0.5}O_2$ was produced in the same manner as Example 1, except that a molar ratio of Na:Mn:Fe was changed into 7:5:5 in production for the composite metal oxide. A coin-type sodium secondary battery of Example 2 was manufactured in the same manner as Example 1, except that the positive electrode produced by using the composite metal oxide of Example 2 was used as a counter electrode.

Example 3

A composite metal oxide of Example 3, i.e., $Na_{0.73}Fe_{0.55}Mn_{0.45}O_2$ was produced in the same manner as Example 1, except that a molar ratio of Na:Mn:Fe is changed into 73:45:55 in production for the composite metal oxide.

Subsequently, a coin-type sodium secondary battery of Example 3 was manufactured in the same manner as Example 1, except that the positive electrode produced by using the composite metal oxide of Example 3 was used as a counter electrode.

Comparative Example 1

A coin-type sodium secondary battery was manufactured in the same manner as Example 1, except that a mixture of the metal-containing compounds was charged into an alumina boat, and calcined in an air atmosphere using an electric furnace under a temperature of at 1000° C. for 12 hours.

Comparative Example 2

A coin-type sodium secondary battery was manufactured in the same manner as Example 1, except that the metal-containing compound as a raw material was weighed such that a molar ratio of Na:Mn:Fe is 1:1/3:2/3.

Evaluation 1

Figure 1B:
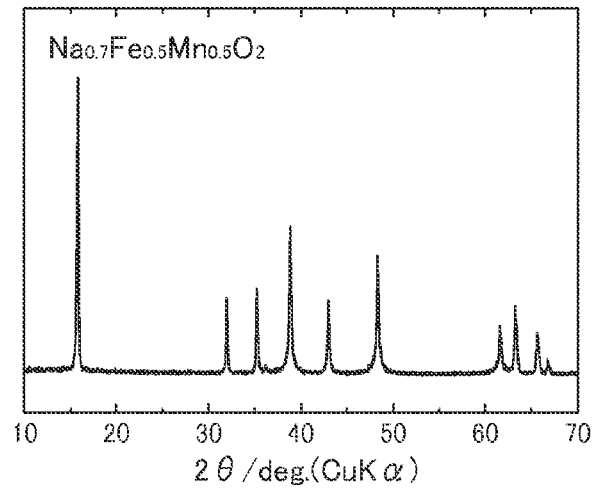
FIG. 1B shows a measurement result of powder X-ray diffraction for a composite metal oxide used in Examples 2.
Figure 1C:
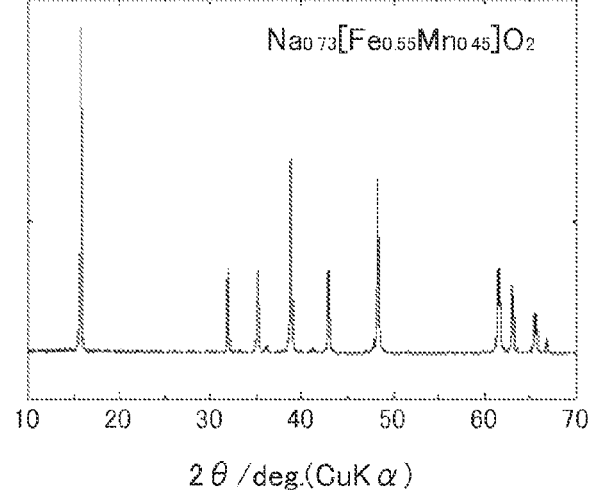
FIG. 1C shows a measurement result of powder X-ray diffraction for a composite metal oxide used in Examples 3.

Powder x-ray diffraction measurement was performed about the composite metal oxide used in Examples 1 to 3, Comparative Examples 1 and 2. The measurement was performed under the following conditions using a powder X-ray diffraction measuring apparatus, MultiFlex manufactured by Rigaku Corporation. The results of the composite metal oxides, used in Example 1, Comparative Example 1 and Comparative Example 2, are shown in FIG. 1A. And the results of the composite metal oxides used in Example 2 and 3, are shown in FIG. 1B and FIG. 1C, respectively.

X-ray: CuKα
Voltage-Current: 30 kV-20 mA
Measurement angle range: 2θ=10 to 70°
Step: 0.01°
Scan Speed: 1°/min From the result of Comparative Example 1 of FIG. 1A, it is confirmed that the width of a peak near 48° is about 0.3°. Therefore, it is confirmed that the composite metal oxide of Comparative Example 1 is an oxide having a P2 structure. From the result of Comparative Example 2, it can be confirmed that a peak near 48° is not present. Therefore, it is confirmed that the composite metal oxide of Comparative Example 2 is an oxide having an O3 structure. From the result of Example 1, it can be confirmed that the width of a peak near 48° is about 0.5°. Therefore, it is confirmed that the composite metal oxide of Example 1 contains an oxide having a P2 structure and an oxide having an O3 structure. It is confirmed by analysis using the DIFFaX program that an oxide having an O3 structure is included in 5% by volume in the composite metal oxide which is the positive active material. Further, from the result of Example 2 of FIG. 1B, it is confirmed that the width of a peak near 48° becomes large especially at the bottom, and is about 2° in width. Therefore, it is confirmed that an oxide having a P2 structure and an oxide having an O3 structure and a P3 structure are contained. It is confirmed by analysis using the DIFFaX program that the oxide having an O3 structure is locally contained in 20% by volume in the composite metal oxide which is the positive active material. The average ratio of the oxide having an O3 structure in the composite metal oxide is about 5% by volume. Further, from the result of Example 3 of FIG. 1C, it is confirmed that the width of a peak near 48° becomes large especially at the bottom, and is about 1° in width. Therefore, it is confirmed that an oxide having a P2 structure and an oxide having an O3 structure and a P3 structure are contained. It is confirmed by analysis using the DIFFaX program that the oxide having an O3 structure is locally contained in about 10% by volume in the composite metal oxide which is the positive active material. The average ratio of the oxide having an O3 structure in the composite metal oxide is about 2% by volume.

Evaluation 2

Figure 2A:
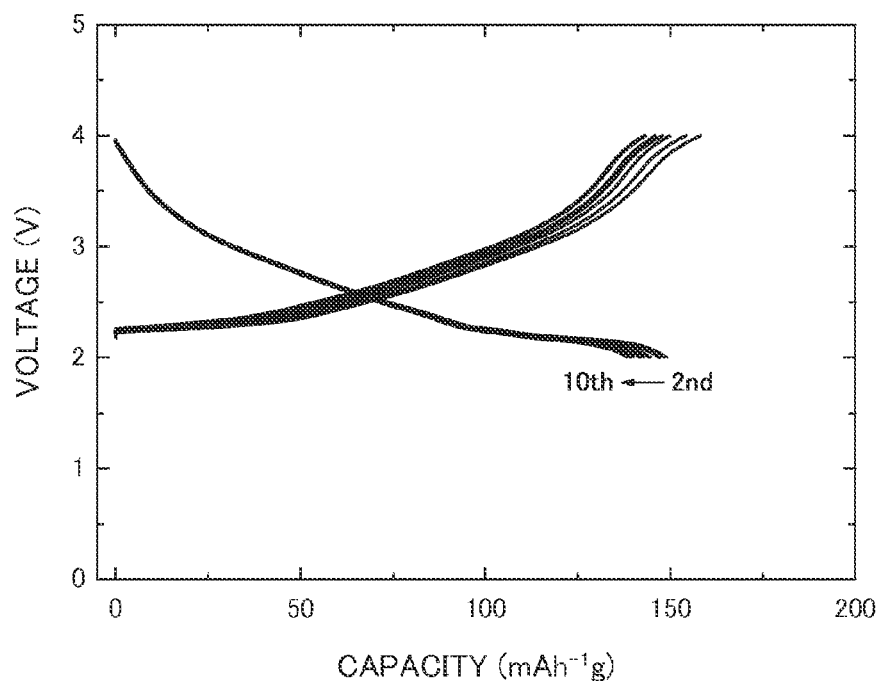
FIG. 2A shows a charge-discharge curve of a sodium secondary battery of Example 1.

A charge-discharge evaluation was performed with respect to the sodium secondary battery of Example 1. It was established so that the current density to each electrode was a current of 12 mA/g, and constant current charge was performed until 4 V. After charge, it was established so that the current density to each electrode was a current of 12 mA/g, and constant current discharge was performed until 2.2 V. FIG. 2A shows a charge-discharge curve from the second cycle to the tenth cycle after the charge-discharge was performed for 10 cycles. Further, charge-discharge of Evaluation 1 was performed under the temperature condition of 25° C.

Figure 2B:
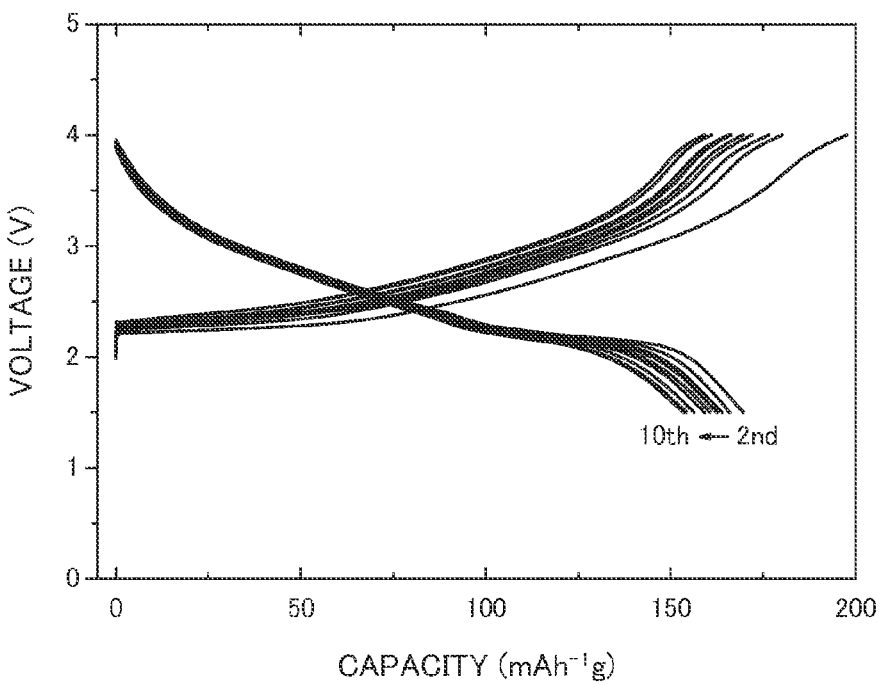
FIG. 2B shows a charge-discharge curve of a sodium secondary battery of Example 1.

The charge-discharge was performed for 10 cycles in the same manner as the aforementioned method, except a discharge voltage was set to 1.5V. FIG. 2B shows a charge-discharge curve from the second cycle to the tenth cycle.

As clear from the results of FIG. 2A and FIG. 2B, it is confirmed that the sodium secondary battery of Example 1 has, depending on conditions, a high discharge capacity larger than about 150 mAh/g even though the charge-discharge was performed for several cycles.

Evaluation 3

The charge-discharge evaluation for 20 cycles was performed with respect to the sodium secondary batteries of Example 1 and Comparative Example 1, as shown in FIG. 3. The current density to each electrode was a current of 12 mA/g. In one case, the constant current charge was performed until 4V, and the constant current discharge was performed until 1.5V. The relationship between a cycle number and capacity is shown in FIG. 3 by triangular marks. Further, in another case, the constant current charge was performed until 3.8V, and the constant current discharge was performed until 2.2V. The relationship between a cycle number and capacity is shown in FIG. 3 by quadrangular marks.

It is confirmed that the sodium secondary battery of Example 1 is stable with the high capacity compared with the sodium secondary battery of Comparative Example 1.

Evaluation 4

Figure 4:
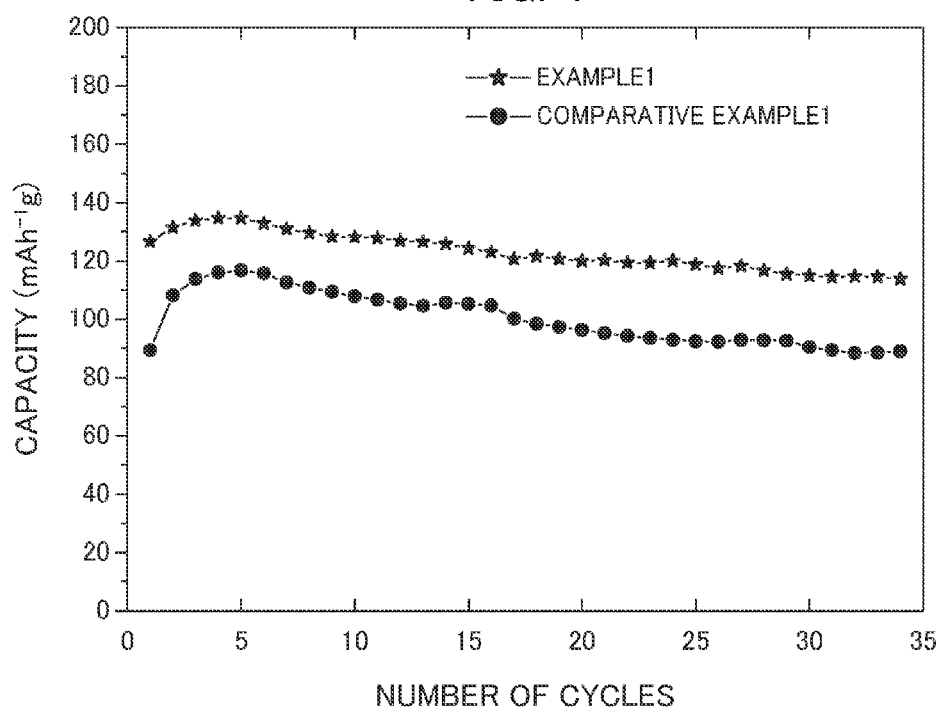
FIG. 4 shows a relationship between a cycle number and capacity in Evaluation 4 with respect to the sodium secondary battery of Example 1 and the sodium secondary battery of Comparative Example 1.

The charge-discharge evaluation for 35 cycles was performed with respect to the sodium secondary batteries of Example 1 and Comparative Example 1, as shown in FIG. 4. The current density to each electrode was a current of 12 mA/g. The constant current charge was performed until 3.8V or 4V, and the constant current discharge was performed until 2.2V or 1.5V. FIG. 4 shows the relationship between a cycle number and capacity.

It is confirmed that the sodium secondary battery of Example 1 is stable with the high capacity compared with the sodium secondary battery of Comparative Example 1 even though the charge-discharge was performed under conditions different from Evaluation 3.

Evaluation 5

Figure 5:
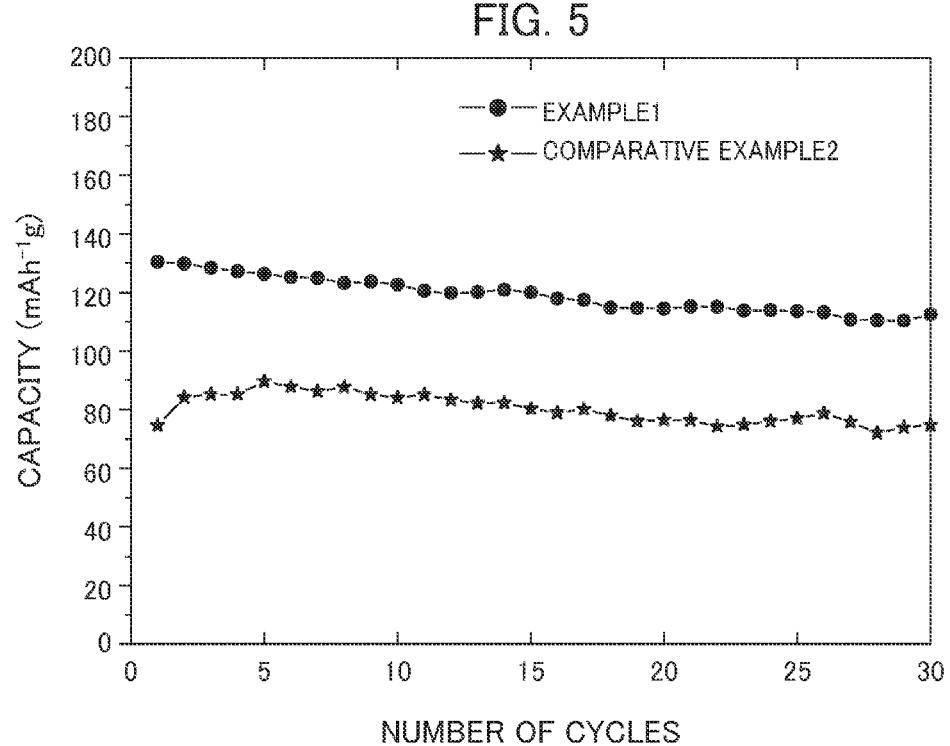
FIG. 5 shows a relationship between a cycle number and capacity with respect to the sodium secondary battery of Example 1 and the sodium secondary battery of Comparative Example 2.

The charge-discharge evaluation for 30 cycles was performed with respect to the sodium secondary batteries of Example 1 and Comparative Example 2, as shown in FIG. 5. The current density to each electrode was a current of 12 mA/g. The constant current charge was performed until 4V, and the constant current discharge was performed until 2.2V. FIG. 5 shows the relationship between a cycle number and capacity.

It is confirmed that the sodium secondary battery of Example 1 is stable with the high capacity compared with the sodium secondary battery of Comparative Example 2.

Evaluation 6

Figure 6:
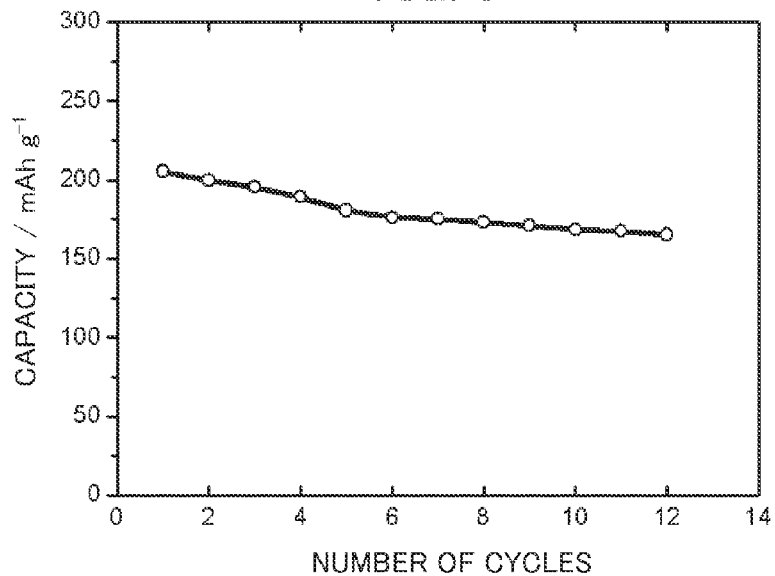
FIG. 6 shows a relationship between a cycle number and capacity with respect to the sodium secondary battery of Example 2

The charge-discharge evaluation was performed with respect to the sodium secondary battery of Example 2. It was established so that the current density to each electrode was a current of 12 mA/g, and constant current charge was performed until 4.3 V. After charge, it was established so that the current density to each electrode was a current of 12 mA/g, and constant current discharge was performed until 1.5 V. FIG. 6 shows the relationship between a cycle number and discharge capacity, from the first cycle to the twelfth cycle, after the charge-discharge was performed for 30 cycles. Further, charge-discharge of Evaluation 6 was performed under the temperature condition of 25° C.

As clear from the result of FIG. 6, it is confirmed that the sodium secondary battery of Example 2 has, depending on condition, a high discharge capacity larger than about 200 mAh/g during several cycles. Further, when the charge-discharge was repeatedly performed, a discharge capacity is slightly lower than 200 mAh/g, but it is confirmed that the sodium secondary battery is stable with the high discharge capacity.

Evaluation 7

Figure 7:
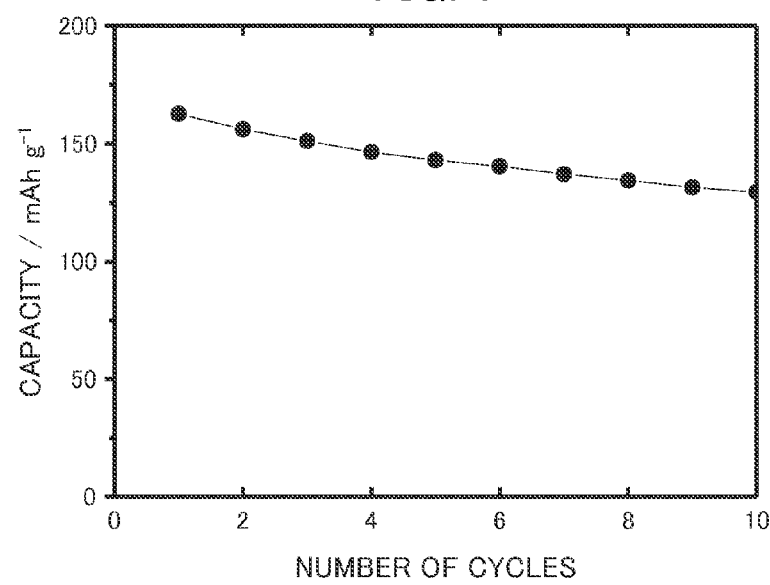
FIG. 7 shows a relationship between a cycle number and capacity with respect to the sodium secondary battery of Example 3.

The charge-discharge evaluation for the sodium secondary battery of Example 3 was performed in the same manner as that of the sodium secondary battery of Example 2. FIG. 7 shows the relationship between a cycle number and the discharge capacity, from the first cycle to the tenth cycle.

As shown in FIG. 7, it is confirmed that the sodium secondary battery of Example 3 has, depending on condition, a high discharge capacity larger than about 150 mAh/g during several cycles.

The invention claimed is:

1. A composite metal oxide represented by the following formula (I):

$$Na_xFe_yMn_{1-y}O_2 \qquad (I)$$

wherein the value of x is ⅔ or more and less than 1, and the value of y is ⅓ or more and less than ⅔, wherein the composite metal oxide has an x-ray diffraction peak near 48 degree, and wherein the composite metal oxide is constituted of an oxide having a P2 structure and a lamellar oxide, said lamellar oxide containing some extent of stacking faults, having and having an octahedral structure and/or a tri-angular-prism structure.

2. The composite metal oxide according to claim 1, wherein the lamellar oxide is an oxide having an O3 structure.

3. The composite metal oxide according to claim 1, wherein a ratio of the lamellar oxide present in the composite metal oxide is 3 to 15% by volume.

4. A process for producing the composite metal oxide according to claim 1, the process comprising calcination of a mixture of a sodium compound, a manganese compound, and an iron compound under a temperature of 800 to 1000° C. for 2 to 24 hours.

5. A positive active material for a sodium secondary battery, the positive active material comprising the composite metal oxide according to claim 1.

6. A positive electrode for a sodium secondary battery, the positive electrode comprising the positive active material according to claim 5.

7. A sodium secondary battery comprising the positive electrode according to claim 6.

* * * * *